United States Patent
Berkey

(10) Patent No.: US 7,489,850 B1
(45) Date of Patent: Feb. 10, 2009

(54) PHOSPHOROUS AND ALKALI DOPED OPTICAL FIBER

(75) Inventor: George Edward Berkey, Pine City, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 11/978,858

(22) Filed: Oct. 30, 2007

(51) Int. Cl.
*G02B 6/00* (2006.01)
*G02B 6/02* (2006.01)
*C03B 37/023* (2006.01)

(52) U.S. Cl. .................. 385/141; 65/385; 385/142
(58) Field of Classification Search ............. 65/385; 385/142, 123, 141, 144
See application file for complete search history.

(56) References Cited

U.S. PATENT DOCUMENTS

| | | | |
|---|---|---|---|
| 6,672,106 B1 | 1/2004 | Hawtof et al. | 65/17.2 |
| 6,837,076 B2 | 1/2005 | Hawtof | 65/413 |
| 6,904,772 B2 | 6/2005 | Berkey et al. | 65/412 |
| 7,076,141 B2 | 7/2006 | Berkey et al. | 385/123 |
| 7,088,900 B1 | 8/2006 | Mishra | 385/142 |
| 2004/0187525 A1 | 9/2004 | Coffey et al. | 65/390 |
| 2005/0063663 A1 | 3/2005 | Anderson et al. | 385/142 |
| 2005/0129376 A1 | 6/2005 | Hanson et al. | 385/123 |
| 2005/0144986 A1 | 7/2005 | Bookbinder et al. | 65/412 |
| 2005/0201699 A1 | 9/2005 | Ball et al. | 385/123 |
| 2006/0130530 A1 | 6/2006 | Anderson et al. | 65/394 |
| 2008/0039309 A1* | 2/2008 | Wolff et al. | 501/46 |
| 2008/0068703 A1* | 3/2008 | Nakatsuka et al. | 359/341.5 |

* cited by examiner

*Primary Examiner*—Charlie Peng
(74) *Attorney, Agent, or Firm*—Matthew J. Mason

(57) ABSTRACT

Disclosed is an optical fiber having a silica-based core and a silica-based cladding, the core comprising germania, and oxides of an alkali metal and phosphorous. By appropriately selecting the concentration of alkali metal and phosphorous oxides, fibers exhibiting low attenuation and low hydrogen aged attenuation may be obtained. In a preferred embodiment, the alkali metal oxide is potassium oxide ($K_2O$).

19 Claims, 6 Drawing Sheets

PHOSPHOROUS AND ALKALI DOPED OPTICAL FIBER

BACKGROUND OF THE INVENTION

1. Field of the Invention

The present invention relates generally to an optical fiber, and more particularly to low-loss, silica-germania-containing optical fiber doped with phosphorous and alkali metal oxides.

2. Technical Background

Attenuation is a principal limiting attribute of optical fibers. Optical fiber loss, for example, plays an important role in limiting the distance between optical fiber amplifiers. This is particularly important in long distance and ultra-long distance networks such as, for example, undersea applications, where such amplifiers represent a significant system cost, as well as a major factor in system reliability. Consequently there is tremendous commercial interest in reducing attenuation to the lowest possible level.

Electromagnetic radiation traveling through an optical waveguide fiber is subject to attenuation or loss due to several mechanisms. Although some of these mechanisms can not be reduced, others have been eliminated, or at least substantially reduced.

A particularly problematic component of optical fiber attenuation is the attenuation due to absorption by the optical waveguide fiber of impurities present in the light guiding region of the fiber. Particularly troublesome is the attenuation caused by the hydroxyl radical (OH), which can be formed in the optical waveguide fiber when a source of hydrogen is present in the fiber material, or when hydrogen available from several sources during the fiber manufacturing process diffuses into the glass. Silica bodies of the type used in optical fiber and optical fiber preform manufacture can contain a substantial amount of OH. Generally speaking, the hydrogen bonds with the oxygen available in the $SiO_2$ and/or $GeO_2$ and/or other oxygen containing compound in the glass matrix to form the OH and/or $OH_2$ bonds referred to generally as "water". The attenuation increase due to OH or water in the glass can be as high as about 0.5 to 1.0 dB/km.

Silica glass doped with an alkali metal oxide, such as $K_2O$, has been shown to be capable of reducing attenuation in optical fibers. Nevertheless, optical fiber doped with alkali metal oxides can result in unacceptable amounts of hydrogen induced attenuation change.

SUMMARY OF THE INVENTION

The present invention is intended to address and obviate problems and shortcomings and otherwise improve the systems and methods for producing optical fibers.

To achieve the foregoing, one embodiment of the present invention includes an optical fiber including a silica-based core including germania, an alkali metal oxide and $P_2O_5$, and a silica-based cladding surrounding and directly adjacent to the core.

In a preferred embodiment, the alkali metal oxide is $K_2O$, which is preferably present in the core in an average concentration of from 10 to 200 ppm, even more preferably from 10 to 60 ppm.

In a preferred embodiment, $P_2O_5$ is present in the core in an average concentration of from 0.01% to 0.05% by weight.

In a preferred embodiment, the attenuation of the optical fiber at 1550 nm is less than 0.185 dB/km and even more preferably less than 0.180 dB/km.

In a preferred embodiment, the optical fiber exhibits a maximum hydrogen induced attenuation change of less than about 0.003 dB/km at a wavelength of about 1550 nm after being subjected to a 0.01 atm hydrogen partial pressure for at least 144 hours.

In a preferred embodiment, the optical fiber exhibits a total dispersion of from 15 to 25 ps/nm/km at 1550 nm and a dispersion slope of less than about 0.07 ps/nm²/km at 1550 nm.

Another aspect of the invention includes an optical fiber including a silica-based core including germania and $P_2O_5$, and a silica-based cladding surrounding and directly adjacent to the core. The attenuation of the optical fiber at 1550 nm is less than 0.185 dB/km, preferably less than 0.180 dB/km, and the optical fiber exhibits a maximum hydrogen induced attenuation change of less than about 0.003 dB/km at a wavelength of about 1550 nm after being subjected to a 0.01 atm hydrogen partial pressure for at least 144 hours.

Another aspect of the invention includes a method of producing an optical fiber including depositing a silica-based reaction product on a substrate to form a soot body, the soot body having opposing first and second ends, removing the substrate from the soot body, thereby forming a centerline hole extending axially through the soot body from the first end to the second end of the soot body, the centerline hole having two opposing ends disposed at the first and second ends of the soot body, respectively, and inserting a glass body into the centerline line hole on at least the first end of the soot body, the glass body including at least one alkali metal oxide. The method further includes drying the soot body, consolidating the soot body to form a glass perform, drawing the glass perform to form a cylindrical glass body, overcladding the cylindrical glass body with at least one silica-based reaction product, and drawing the overclad cylindrical glass body into a fiber.

In a preferred embodiment, the alkali metal oxide in the glass body is selected from $K_2O$ and $Na_2O$. In a particularly preferred embodiment, the alkali metal oxide in the glass body is $K_2O$.

In a preferred embodiment, the method results in a fiber having an alkali metal oxide present in the core of the fiber in an average concentration of from 10 ppm to 200 ppm, even more preferably from 10 ppm to 60 ppm.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
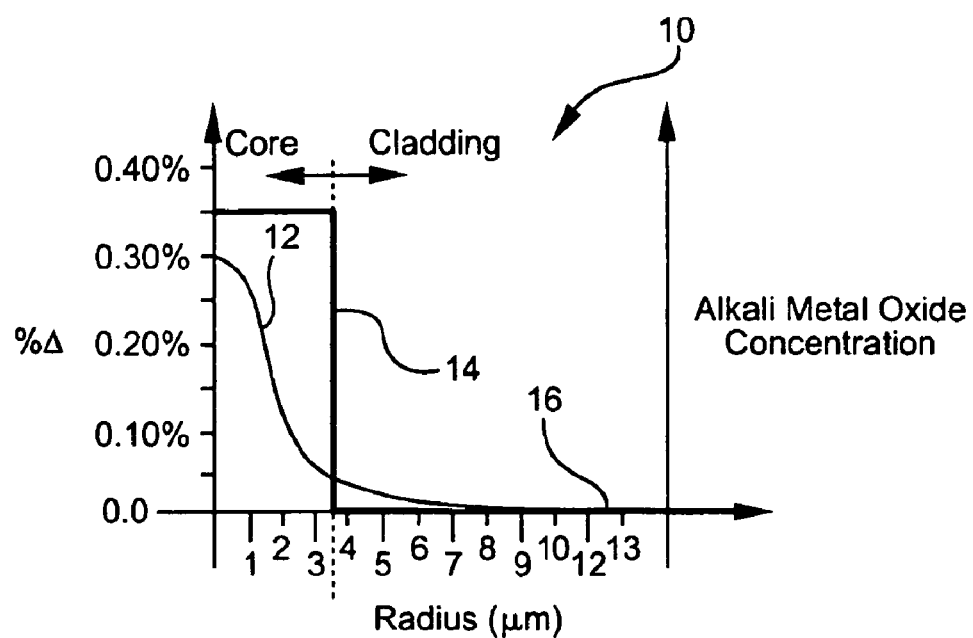
FIG. 1 is an illustration of a portion of a step index refractive index profile of an optical fiber with a silica-based cladding and a silica-based core doped with germania and trace amounts of alkali metal oxide and $P_2O_5$.

Reference will now be made in detail to the present preferred embodiment(s) of the invention, examples of which are illustrated in the accompanying drawings. Whenever possible, the same reference numerals will be used throughout the drawings to refer to the same or like parts.

The present invention relates to a potassium and phosphorous doped optical fiber and methods for making the same. More specifically, the invention relates to an optical fiber doped with oxides of alkali metals and phosphorous and methods for manufacturing the optical fiber and associated performs.

Silica glass doped with an alkali metal oxide, such as $K_2O$, has been shown to be capable of reducing attenuation in optical fibers. However, optical fiber up-doped with $GeO_2$ and additionally doped with attenuation reducing amounts of alkali metal oxides can have unacceptable amounts of hydrogen induced attenuation change. While lowering the levels of alkali metal oxide in the fiber can reduce the hydrogen induced attenuation change, such also tends to lower the attenuation reducing effect.

It has been surprisingly found that the addition of dopants such as $P_2O_5$ in combination with small amounts of alkali metal oxide, such as $K_2O$, can have a dramatic effect on the viscosity of silica or silica-germania and it is believed that this will in turn reduce the density fluctuation component of Rayleigh scattering much more than it will increase the concentration fluctuation component of Rayleigh scattering. By using the combination of $P_2O_5$ and small amounts of alkali metal oxide as dopants, a resulting germania doped silica fiber can be produced that possesses a combination of lower attenuation and lower hydrogen induced attenuation change than can be produced when a germania doped silica fiber contains only one or neither of these dopants. In a preferred embodiment, the alkali metal oxide is $K_2O$. In another preferred embodiment, the alkali metal oxide is $Na_2O$.

Such fibers may be produced in a relatively inexpensive and production friendly manner. For example, such fibers may be produced without the need for an exterior hermetic coating. Such fibers may also be produced without the need to down-dope with a refractive index lowering dopant such as fluorine.

In at least one embodiment, a small amount of alkali metal oxide, such as $K_2O$, can be provided to the fiber through the use of a tip plug, as described herein. The tip plug affords a convenient way to dope while the blank is in the soot stage and, in addition to providing a relatively uniform alkali metal oxide concentration profile as a function of radius, allows for alkali metal oxide to be doped with a relatively high level of purity because the silica in the tip plug acts as a sieve to filter out impurities such as iron and other transition metals, which are less mobile in silica than alkali metal oxides, particularly $Na_2O$ and $K_2O$.

The following terms as used herein have the following meanings:

The refractive index profile is the relationship between refractive index and waveguide fiber radius.

A segmented core is one that is divided into at least a first and a second waveguide fiber core portion or segment. Each portion or segment is located along a particular radial length, is substantially symmetric about the waveguide fiber centerline, and has an associated refractive index profile.

The radii of the segments of the core are defined in terms of the respective refractive indexes at respective beginning and end points of the segments. The definitions of the radii used herein are set forth in the figures and the discussion thereof.

Total dispersion of a waveguide fiber is the sum of the material dispersion, the waveguide dispersion, and the inter-modal dispersion. In the case of single mode waveguide fibers the inter-mode dispersion is zero.

The sign convention generally applied to the total dispersion is as follows. Total dispersion is said to be positive if shorter wavelength signals travel faster than longer wavelength signals in the waveguide. Conversely, in a negative total dispersion waveguide, signals of longer wavelength travel faster.

The relative refractive index percent, $$\Delta\% = 100 \times (n_i^2 - n_c^2)/2n_i^2$$

where $n_i$ is the maximum refractive index in region i, unless otherwise specified, and $n_c$ is the average refractive index of the cladding region.

The term α-profile refers to a refractive index profile, expressed in terms of $\Delta(b)\%$ where b is radius, which follows the equation, $$\Delta(b)\% = \Delta(b_0)(1-[|b-b_0|/(b_1-b_0)]^\alpha)$$

where $b_0$ is the point at which $\Delta(b)\%$ is maximum, $b_1$ is the point at which $\Delta(b)\%$ is zero, and b is in the range $b_i \leq b \leq b_f$, where delta is defined above, $b_i$ is the initial point of the α-profile, $b_f$ is the final point of the α-profile, and α is an exponent which is a real number. The initial and final points of the α-profile are selected and entered into the computer model. As used herein, if an α-profile is preceded by a step index profile or any other profile shape, the beginning point of the α-profile is the intersection of the α profile and the step or other profile.

In the model, in order to bring about a smooth joining of the α-profile with the profile of the adjacent profile segment, the equation is rewritten as;

$$\Delta(b)\% = \Delta(b_a) + [\Delta(b_0) - \Delta(b_a)]\{1-[|b-b_0|/(b_1-b_0)]^\alpha\}$$

where $b_a$ is the first point of an adjacent segment.

Core refers to that portion of the optical fiber which has a generally raised index of refraction relative to the cladding, so that the transmitted optical power propagates predominately through the core. The core may be comprised of one or more segments. An individual core segment may have a refractive index greater than pure silica, equal to pure silica, or less than pure silica.

Cladding, or cladding segment, refers to that portion of the optical fiber surrounding the core region, and is defined to occur where the absolute magnitude of the relative refractive index is less than 0.03% and remains less than 0.03% up to the outermost radius of the silica-based part of the optical fiber, that is, up to the outermost radius of the cladding. The core ends, and the cladding begins, at a radius $R_{CORE}$, and the cladding ends at a radius $R_{CLAD}$, where $R_{CLAD} > R_{CORE}$.

"ppm", unless otherwise specifically noted otherwise, refers to parts per million by weight, or "ppm by weight", or "ppm by wt.", and a measurement in weight percent (wt %) can be converted to ppm by multiplying by a factor of 10,000.

"up doped", unless specifically noted otherwise, refers to an optical fiber having a core region doped such that the core region has a higher refractive index than pure silica.

"down doped", unless specifically noted otherwise, refers to an optical fiber having a cladding region doped such that the cladding region has a lower refractive index than pure silica.

Referring to FIG. 1, the core 14 of the optical fiber 10 preferably contains as dopants, germania ($GeO_2$), an alkali metal oxide, and $P_2O_5$. The cladding 16 of the optical fiber may also contain these dopants. It is beneficial, and therefore preferable, to have the peak alkali metal oxide concentration in a single mode optical fiber be substantially coincident with the peak power level of the propagating light's mode field. In at least one embodiment, the alkali metal oxide has a peak concentration in the core of the optical fiber. In at least one embodiment, the alkali metal oxide concentration varies radially across a radius of the optical fiber. In at least one embodiment, the concentration of alkali metal oxide generally decreases as a function of increasing radius from the centerline of the optical fiber along at least a portion of the optical fiber radius. In at least one embodiment, the alkali metal oxide concentration as a function of radius has an approximately Gaussian shape.

In at least one embodiment, the alkali metal oxide concentration is approximately equal as a function of increasing radius from the centerline of the optical fiber along at least a portion of the optical fiber radius.

Preferably, the average concentration of alkali metal oxide in the core of the optical fiber is from 10 to 200 ppm. More preferably, the average concentration of alkali metal oxide in the core of the optical fiber is from 10 to 60 ppm. In a preferred embodiment, the alkali metal oxide is $K_2O$. In another preferred embodiment, the alkali metal oxide is $Na_2O$.

The average concentration of $P_2O_5$ in the core of the optical fiber is preferably from 0.01 wt. % to 0.05 wt. %; more preferably from 0.02 wt. % to 0.04 wt. %; and in one particularly preferred embodiment is from 0.025 wt. % to 0.035 wt. %, including about 0.03 wt. %.

In addition, to the aforementioned dopants, the core and the cladding of the optical fiber may contain one or more additional glass modifying dopants.

The optical fiber can be a single mode or multimode fiber. Preferably the optical fiber is a single mode fiber. The optical fiber can have a step index profile or a graded refractive index profile. In one preferred embodiment, the optical fiber is a single mode fiber having a step index profile. In another preferred embodiment, the optical fiber is a single mode fiber having a graded refractive index profile.

In one embodiment according to the present invention, the refractive index profile of the optical fiber is selected to result in a single mode optical fiber preferably has a zero dispersion wavelength, $\lambda_0$, between about 1280 nm and 1340 nm, a zero dispersion slope, $S_0$, less than about 0.07 ps/nm$^2$/km, and a total dispersion greater than about 15 ps/nm/km at 1550 nm, more preferably between about 15 ps/nm/km and 25 ps/nm/km at 1550 nm. Preferably, the optical fiber has a cutoff wavelength less than about 1300 nm. Preferably the optical fiber has an effective area greater than about 80 µm$^2$ at 1550 nm. The optical fiber preferably has a core diameter greater than about 3 µm, more preferably between about 3 µm and 5 µm, and a mode field diameter greater than about 9 µm, more preferably between about 10 µm and 11 µm at 1550 nm. In at least one embodiment, the core has a peak relative refractive index (relative to the cladding), AMAX, of at least 0.2%, such as from 0.2% to 0.5%, including from 0.3% to 0.4%. In a preferred embodiment, the optical fiber has a core diameter between 3 µm and 5 µm and a core peak relative refractive index of from 0.2% to 0.5%.

Optical fibers in accordance with the invention may be made which have an attenuation less than about 0.30 dB/km at 1310 nm and less than 0.185 dB/km at 1550 nm; more preferably less than 0.180 dB/km at 1550 nm; and even more preferably less than 0.177 dB/km at 1550 nm.

Preferably, the optical waveguide fiber exhibits a maximum hydrogen induced attenuation change of less than about 0.003 dB/km at a wavelength of 1550 nm after being subjected to a 0.01 atm hydrogen partial pressure for at least 144 hours. More preferably, the optical waveguide fiber exhibits a maximum hydrogen induced attenuation change of less than about 0.002 dB/km at a wavelength of 1550 nm after being subjected to a 0.01 atm hydrogen partial pressure for at least 144 hours. Even more preferably, the optical waveguide fiber exhibits a maximum hydrogen induced attenuation change of less than about 0.001 dB/km at a wavelength of 1550 nm after being subjected to a 0.01 atm hydrogen partial pressure for at least 144 hours Preferably, the optical waveguide fiber exhibits a maximum hydrogen induced attenuation change of less than about 0.003 dB/km at a wavelength of about 1550 nm after being subjected to a 0.01 atm hydrogen partial pressure for at least 336 hours. More preferably, the optical waveguide fiber exhibits a maximum hydrogen induced attenuation change of less than about 0.002 dB/km at a wavelength of about 1550 nm after being subjected to a 0.01 atm hydrogen partial pressure for at least 336 hours. Even more preferably, the optical waveguide fiber exhibits a maximum hydrogen induced attenuation change of less than about 0.001 dB/km at a wavelength of about 1550 nm after being subjected to a 0.01 atm hydrogen partial pressure for at least 336 hours.

Preferably, the optical waveguide fiber exhibits a maximum hydrogen induced attenuation change of less than about 0.003 dB/km at each wavelength within a wavelength range from about 1300 nm to about 1600 nm after being subjected to a 0.01 atm hydrogen partial pressure for at least 144 hours. More preferably, the optical waveguide fiber exhibits a maximum hydrogen induced attenuation change of less than about 0.002 dB/km at each wavelength within a wavelength range from about 1300 nm to about 1600 nm after being subjected to a 0.01 atm hydrogen partial pressure for at least 144 hours. Even more preferably, the optical waveguide fiber exhibits a maximum hydrogen induced attenuation change of less than about 0.001 dB/km at each wavelength within a wavelength range from about 1300 nm to about 1600 nm after being subjected to a 0.01 atm hydrogen partial pressure for at least 144 hours.

Preferably, the optical waveguide fiber exhibits a maximum hydrogen induced attenuation change of less than about 0.003 dB/km at each wavelength within a wavelength range from about 1300 nm to about 1600 nm after being subjected to a 0.01 atm hydrogen partial pressure for at least 336 hours. More preferably, the optical waveguide fiber exhibits a maximum hydrogen induced attenuation change of less than about 0.002 dB/km at each wavelength within a wavelength range from about 1300 nm to about 1600 nm after being subjected to a 0.01 atm hydrogen partial pressure for at least 336 hours. Even more preferably, the optical waveguide fiber exhibits a maximum hydrogen induced attenuation change of less than about 0.001 dB/km at each wavelength within a wavelength range from about 1300 nm to about 1600 nm after being subjected to a 0.01 atm hydrogen partial pressure for at least 336 hours.

At least part of the optical fiber may be made by conventional methods, including outside vapor deposition (OVD), vapor axial deposition (VAD), modified chemical vapor deposition (MCVD), and plasma chemical vapor deposition (PCVD). Preferably, at least part of the fiber is made by an OVD process.

Reference will now be made in detail to the present preferred embodiment(s) of the invention, examples of which are illustrated in the accompanying drawings. Whenever possible, the same reference numerals will be used throughout the drawings to refer to the same or like parts.

FIG. 1 shows an exemplary refractive index profile 10 of a single mode up-doped optical fiber having a single core segment, as well as an exemplary alkali metal oxide concentration profile 12 (alkali metal oxide concentration as a function of radius) which may be achieved by practicing the present invention. The optical fiber includes a central core segment 14 and a cladding segment 16. Preferably, the alkali metal oxide concentration varies as a function of radius. In one embodiment, the concentration of alkali metal oxide generally decreases as a function of increasing radius from the centerline of the optical fiber along at least a portion of the optical fiber radius. In one embodiment, the alkali metal oxide concentration as a function of radius has an approximately Gaussian shape. In another embodiment, the alkali metal oxide concentration as a function of radius is approximately constant (not shown). Core segment 14 of the optical fiber may have a step shape as shown in FIG. 1, or core segment 14 may have a rounded, alpha or triangular shape.

While the manufacture of optical fibers according to the invention is not limited to any particular method or technique, the doping of the fibers will preferably be done in a manner that allows for relatively low levels of highly pure alkali metal oxide to be dispersed throughout the fiber core. A particularly preferred method of manufacture is illustrated in FIGS. 2-5 and described below.

Figure 2:
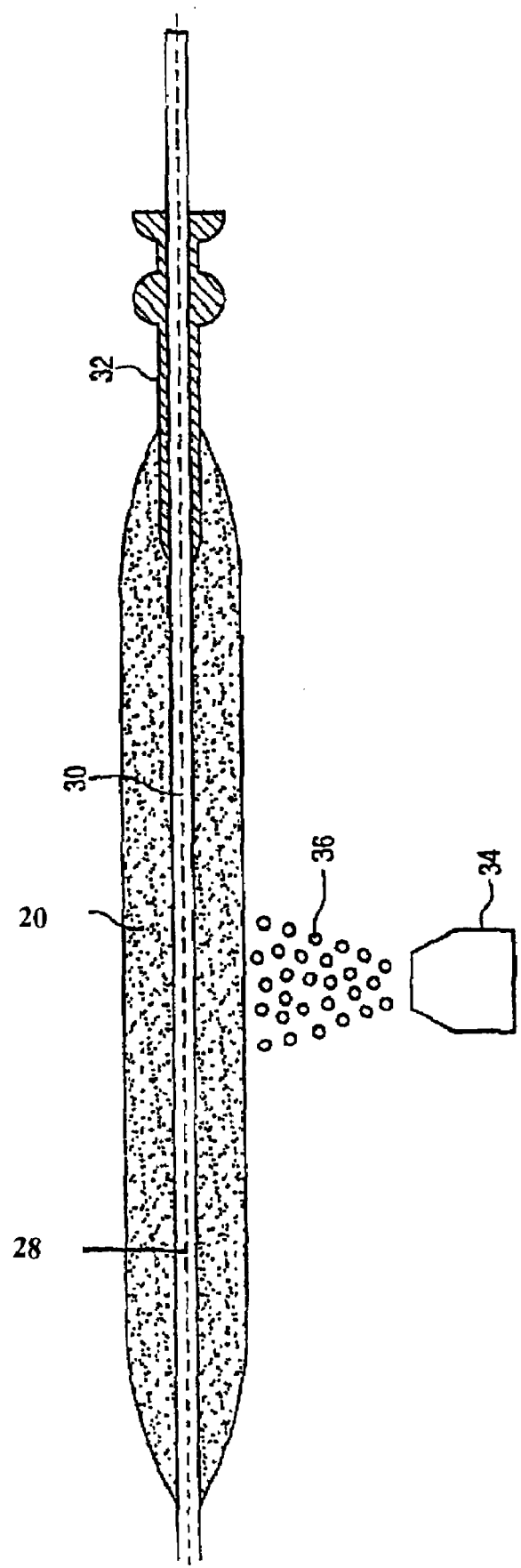
FIG. 2 schematically illustrates the manufacture of a porous body using an outside vapor deposition process in accordance with the present invention.

FIG. 2 shows an OVD process for depositing layers of soot onto a bait rod. As shown in FIG. 2, a substrate or bait rod or mandrel 30 is inserted through a glass body such as hollow or tubular handle 32 and mounted on a lathe (not shown). The lathe is designed to rotate and translate mandrel 30 in close proximity with a soot-generating burner 34. As mandrel 30 is rotated and translated, silica-based reaction product 36, (i.e. "soot") is directed toward mandrel 30. At least a portion of silica-based reaction product 36 is deposited on mandrel 30 and on a portion of handle 32 to form a body 20 thereon.

Silica-based reaction product 36 includes, in addition to silica, germania, and $P_2O_5$. Silica-based reaction product may additionally contain other dopants, such as those commonly known in the art. Suitable germania source compounds include those commonly known in the art (i.e., $GeCl_4$). Suitable $P_2O_5$ source compounds include, for example, $POCl_3$ and $PCl_3$.

While FIG. 2 shows an OVD process, the present invention is not intended to limit soot deposition to an OVD process. Rather, other methods of chemically reacting at least some of the constituents of a moving fluid mixture, such as, but not limited to, liquid delivery of at least one glass-forming precursor compound in an oxidizing medium can be used to form the silica-based reaction product of the present invention, as disclosed, for example, in U.S. Pat. No. 6,672,106, and U.S. Pat. No. 6,837,076, the contents of which are hereby incorporated by reference in their entirety. Moreover, other processes, such as the inside vapor (IV) deposition process, and modified chemical vapor deposition (MCVD) process are also applicable to the present invention.

Figure 3:
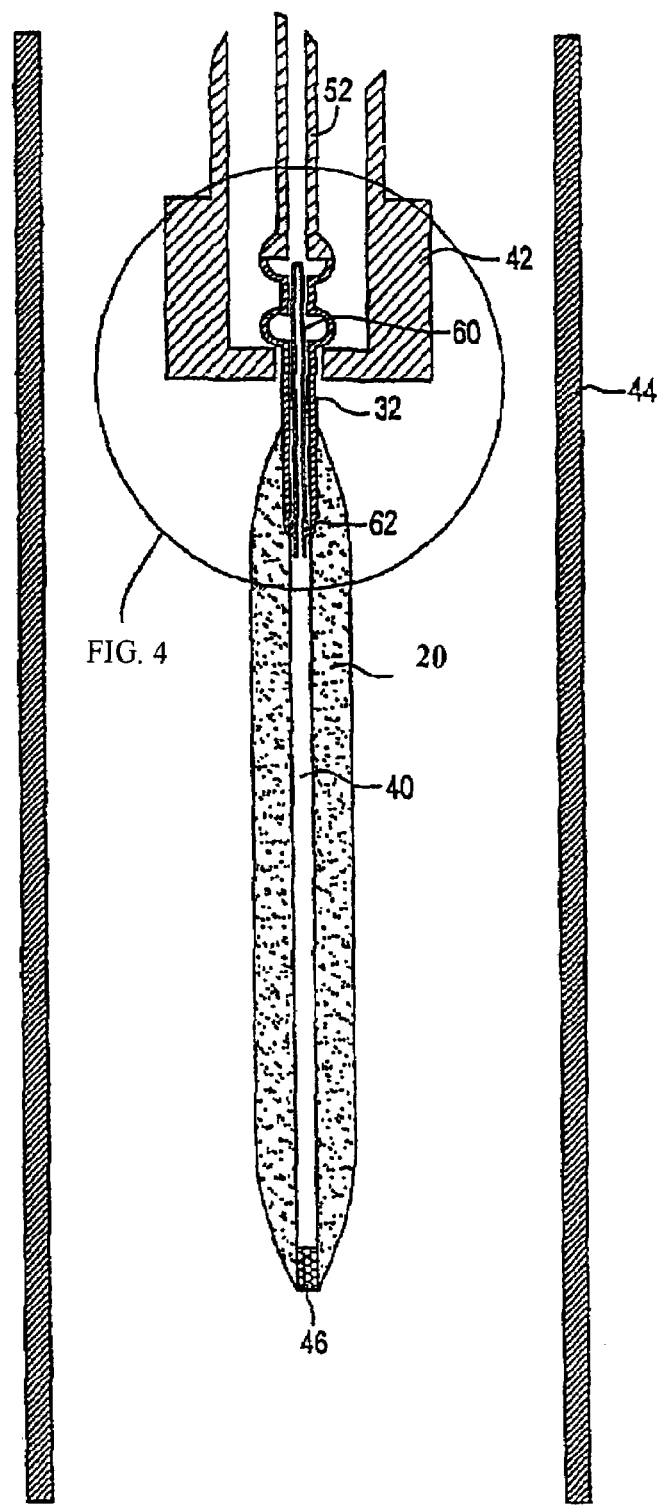
FIG. 3 is a cross-sectional view of the porous body of FIG. 2 shown fitted with top plug and suspended within a consolidation furnace in accordance with the present invention.

Once the desired quantity of soot has been deposited on mandrel 30, soot deposition is terminated and mandrel 30 is removed from soot body 20. As depicted in FIG. 3, upon removal of mandrel 30, soot body 20 defines a centerline hole 40 passing axially therethrough. Preferably, soot body 20 is suspended by handle 32 on a downfeed handle 42 and positioned within a consolidation furnace 44. The end of centerline hole 40 remote from handle 32 is preferably fitted with a bottom plug 46 prior to positioning soot body 20 within consolidation furnace 44. Preferably, bottom plug 46 is positioned and held in place with respect to soot body 20 by friction fit. Plug 46 is further preferably tapered to facilitate entry and to allow at least temporary affixing, and at least loosely, within the soot body 20.

Plug 46 is preferably a glass body and contains at least one alkali metal oxide. In a preferred embodiment, the alkali metal oxide is $K_2O$. In another preferred embodiment, the alkali metal oxide is $Na_2O$. The alkali metal oxide should be present in plug 46 in an amount that will allow for the desired amount of alkali metal oxide to diffuse into the soot body. In a preferred embodiment, the alkali metal oxide can be present in plug 46 in an amount ranging from 1-6% by weight, such as from 2-4% by weight.

Soot body 20 is preferably chemically dried, for example, by exposing soot body 20 to a chlorine containing atmosphere at elevated temperature within consolidation furnace 44. Chlorine containing atmosphere effectively removes water and other impurities from soot body 20, which otherwise would have an undesirable effect on the properties of optical waveguide fiber manufactured from soot body 20. In an OVD formed soot body 20, the chlorine flows sufficiently through the soot to effectively dry the entire blank, including the region surrounding centerline hole 40.

Following the chemical drying step, the temperature of the furnace is elevated to a temperature sufficient to consolidate the soot blank into a sintered glass preform, preferably about 1500° C. The centerline hole 40 is closed during the consolidation step.

Figure 4:
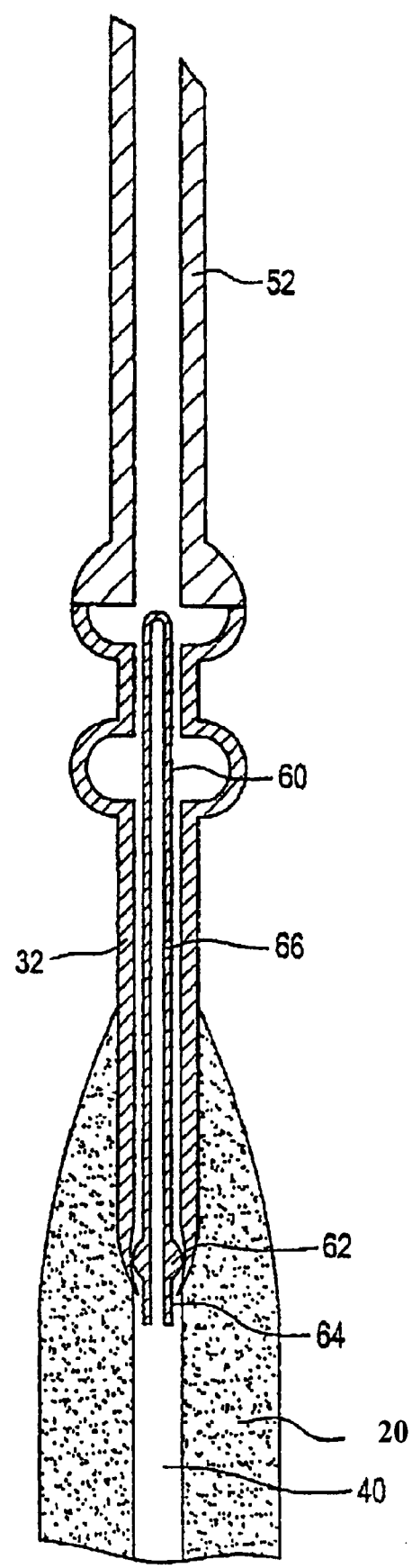
FIG. 4 is an enlarged cross-sectional view of the top plug shown positioned within the handle as depicted in FIG. 3.

Referring to FIG. 4, preferably, a glass body such as hollow tubular glass plug or top plug 60 having a open end 64 is positioned in centerline hole 40 in soot body 20 opposite plug 46 (as shown in FIG. 3). Top plug 60 is shown disposed within the cavity of tubular handle 32. Following chlorine drying, soot body 20 is down driven into the hot zone of consolidation furnace 44 (as shown in FIG. 3) to seal centerline hole 40 and consolidate soot body 20 into a sintered glass preform. Drying and consolidation may optionally occur simultaneously. During consolidation, soot body 20 contracts somewhat and engages bottom plug 46 and the lower end of top plug 60, thereby fusing the resulting sintered glass preform to plug 46 and plug 60 and sealing the centerline hole 40. Sealing of both the top and bottom of centerline hole 40 can be accomplished with one pass of soot body 20 through the hot zone. Preferably, sintered glass preform is held at an elevated temperature, preferably in a holding oven, to allow inert gas to diffuse from centerline hole 40 to form a passive vacuum within sealed centerline hole 40. Preferably, top plug 60 has a relatively thin wall through which diffusion of the inert gas can more expediently occur. As depicted in FIG. 4, top plug 60 preferably has an enlarged portion 62 for supporting plug 60 within handle 32, and a narrow portion 64 extending into centerline hole 40 of soot body 38. Plug 60 also preferably includes an elongated hollow portion 66 which may preferably occupy a substantial portion of handle 32. Hollow portion 66 provides additional volume to centerline hole 40 thereby providing a better vacuum within centerline hole 40 following diffusion of the inert gas.

During consolidation, alkali metal diffuses from bottom plug 46 into soot body 20.

As described above and elsewhere herein, bottom plug 46 and top plug 60 are preferably glass bodies having a water content of less than about 30 ppm by weight, such as fused quartz plugs, and preferably less than 5 ppb by weight, such as chemically dried silica plugs. Typically, such plugs are dried in a chlorine-containing atmosphere, but an atmosphere containing other chemical drying agents are equally applicable. Ideally, the glass plugs will have a water content of less than 1 ppb by weight. In addition, the glass plugs are preferably thin walled plugs ranging in thickness from about 200 μm to about 2 mm. Even more preferably, at least a portion of plug 60 has a wall thickness of about 0.2 to about 0.5 mm. More preferably still, elongated portion 66 has a wall thickness of about 0.3 mm to about 0.4 mm. Thinner walls promote diffusion, but are more susceptible to breakage during handling.

Inert gas is preferably diffused from the centerline hole after the centerline hole has been sealed to create a passive vacuum within the centerline hole, and thin walled glass plugs can facilitate rapid diffusion of the inert gas from the centerline hole. The thinner the plug, the greater the rate of diffusion.

Preferably, all glass bodies which are to be placed in contact with the centerline hole before disposing same in, on, or near a soot body or silica-based reaction product or sintered glass preform are pre-deuterized. In one preferred embodiment, plug 60 was exposed to 5% deuterium in a helium atmosphere at 1 atm at about 1000° C. for about 24 hours. In another preferred embodiment, plug 60 was exposed to 3% deuterium in a nitrogen atmosphere at 1 atm at about 1000° C. for about 24 hours.

Following the above-described steps, the sintered glass preforms can be removed from consolidation furnace 44 and thereafter stored for further processing at a later time, preferably within a holding oven, or positioned within a redraw furnace where the glass preforms can be drawn into a reduced diameter cylindrical glass body such as a core cane, if desired. Because the sintered glass preform has a sealed centerline hole, the centerline region and the centerline hole are not accessible to ambient atmosphere, or any other environment that includes a hydrogen containing compound. Accordingly, the centerline region and centerline holes of the respective sintered glass preforms will remain dry during storage and/or en route to the redraw furnace.

At redraw, the sintered glass preforms formed as described above are suspended within a furnace. The temperature within furnace is elevated to a temperature which is sufficient to stretch the glass preforms, preferably about 1950° C. to about 2100° C., and thereby reduce the diameters of the preforms to form a cylindrical glass body such as a core cane. Centerline hole 40 closes to form a centerline region during the redraw process. The reduced pressure maintained within sealed centerline hole 40 created passively during consolidation, is generally sufficient to facilitate complete centerline hole 40 closure during redraw.

The reduced diameter core cane, a portion of which preferably constitutes cladding, produced by any of the above-described embodiments can be overclad, such as by further soot deposition, for example by an OVD process or with a rod-in-tube arrangement, and subsequently drawn into an optical waveguide fiber having a central core portion bounded by a cladding glass.

Figure 5:
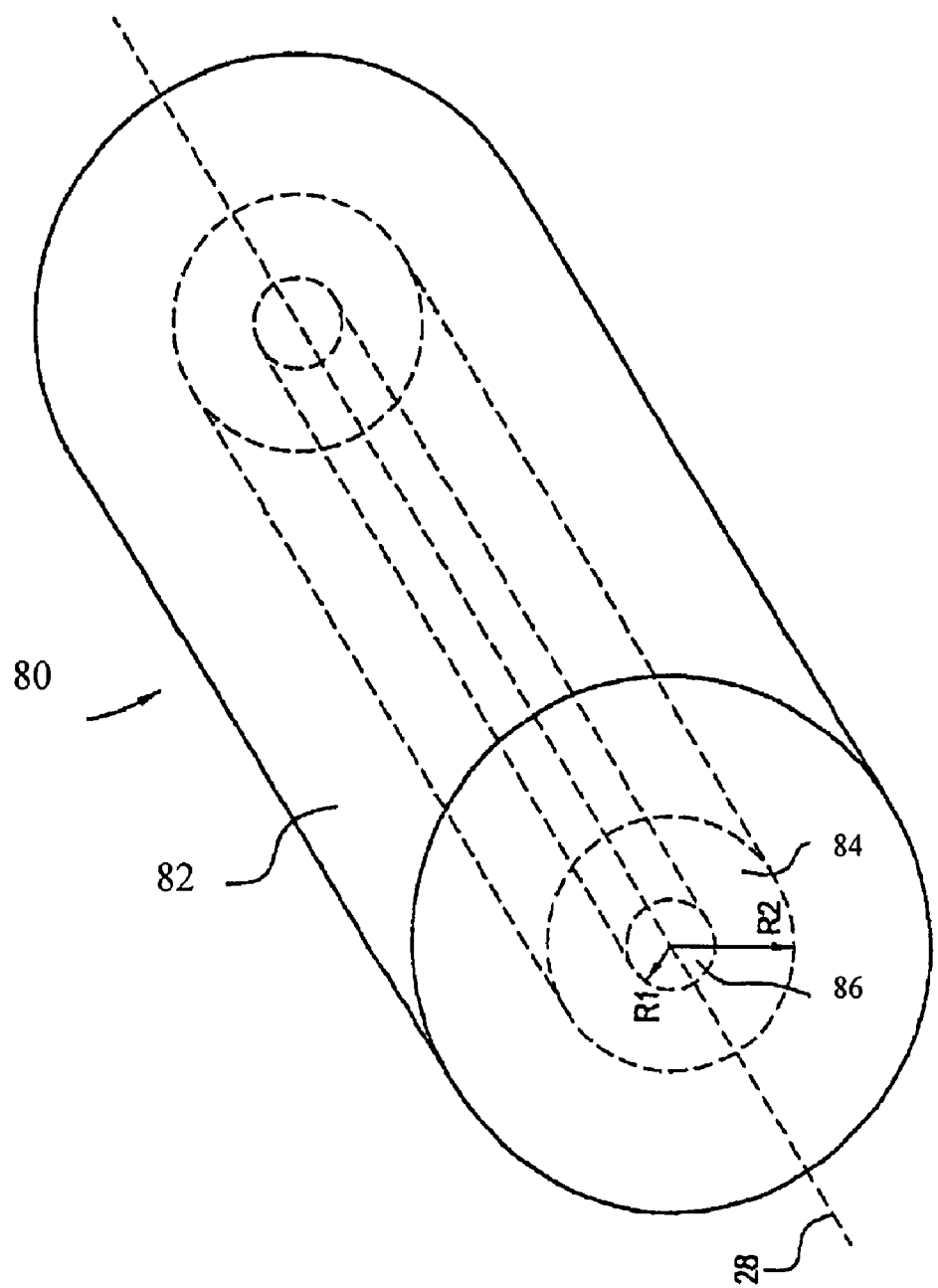
FIG. 5 is a perspective view of a cylindrical glass body shown depicting the centerline region R2 in accordance with the present invention.

As shown in FIG. 5, cylindrical optical fiber body 80 includes a silica containing glass region 82. Silica containing glass region 82 includes a centerline region 84 preferably having a weighted average OH content of less than about 2 ppb, and even more preferably less than about 1 ppb. Centerline region 84 preferably bounds a smaller diameter dopant (preferably germania) containing region 86 (depicted by radial distance R1), and both centerline region 84 and dopant containing region 86 extend longitudinally along central axis 28 of cylindrical optical fiber body 80.

Centerline region 84, represented by radial distance R2 as depicted in FIG. 5 is defined as that portion of optical fiber body 80 wherein about 99% of the propagated light travels. Stated differently, when the attenuation spectra of an optical waveguide fiber manufactured from optical fiber body 80 can be measured on a Photon Kinetics attenuation measurement bench (PK bench) at a wavelength of 1380 nm. In preferred embodiments, the centerline region comprises segments or annular regions. Preferably, two or more segments have positive refractive indexes or positive relative refractive indexes.

The optical fiber body 80 represents either a glassy preform which serves as a precursor to an optical waveguide fiber, or the fiber itself, as the relative dimensions of the regions at a given cross-section are preserved after drawing the optical fiber preform into a fiber.

In a preferred embodiment, the core and cladding form neither a step-index profile nor a graded index profile.

The drawn optical waveguide fiber is then preferably deuterized. Deuteration can be carried out by a number of various processes, and may be achieved by maintaining a silica body or part thereof at an elevated temperature in an atmosphere comprising deuterium. Appropriate heat treating times and temperatures can be determined from data available in the literature. The atmosphere can be either substantially D2 or may also comprise inert diluents, e.g., $N_2$ or Ar. The time required for substantially complete deuterium/hydrogen (D/H) exchange throughout a volume of silica depends substantially exponentially on the temperature, at least approximately on the square of the diffusion distance, and approximately proportionally to the OH-concentration initially present in the silica body. The skilled artisan can estimate required heat treating times from data available in the literature. The required time also depends to some degree on the concentration of deuterium in contact with the silica body. Typically, a deuterium partial pressure of at least about 10 Torr can produce effective infusion of deuterium at appropriate temperatures.

In at least one embodiment, duteration can be carried out at 50° C. for 30 hours.

Thus, for a given D2 concentration, treatment times and temperatures could also be varied with equivalently effective results, independent of the carrier gas type. D2 concentration could be also be varied with correspondingly varied time and temp and yield equivalently effective results.

In at least one preferred embodiment, the optical waveguide fiber does not include an exterior hermetic coating.

In at least one preferred embodiment, the refractive index of both the core and the cladding of the optical waveguide fiber is equal to or greater than that of pure silica.

In at least one preferred embodiment, neither the core nor the cladding of the optical waveguide fiber contain a refractive index lowering dopant.

Figure 6:
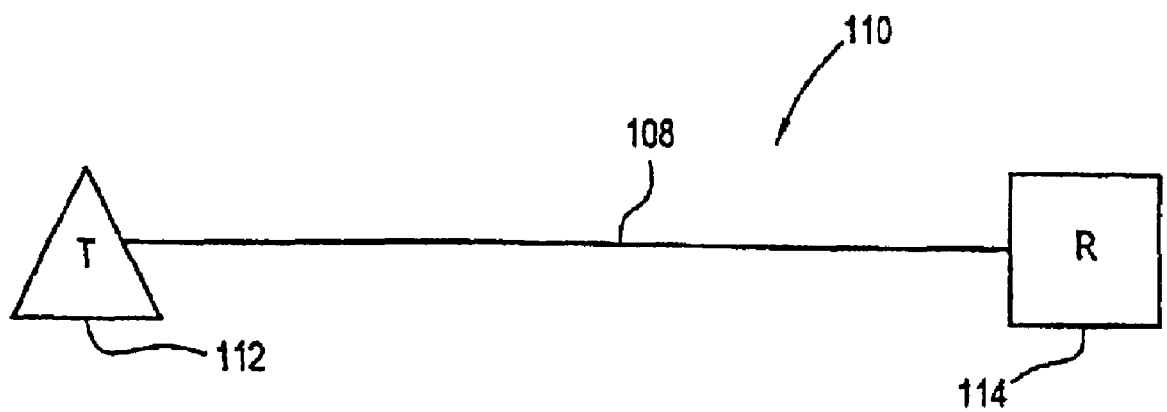
FIG. 6 is an optical fiber communication system in accordance with the present invention.

As shown in FIG. 6, and in accordance with another embodiment of the present invention, an optical fiber 108 manufactured in accordance with the present invention can form part of an optical fiber communication system 110.

Optical fiber communication system 110 generally includes a transmitter 112, a receiver 114, and optical waveguide fiber 108 for communicating an optical signal between transmitter 112 and receiver 114.

EXAMPLES

The invention will be further clarified by the following example.

Example 1

A silica-based reaction product, containing silica, germania, and $P_2O_5$ was deposited onto a mandrel using a standard OVD technique. The resulting soot body was removed from the mandrel and a glass plug containing 3 wt % $K_2O$ was fitted to the soot body by friction fit as described above. The soot body was then consolidated in a standard consolidation furnace, thereby fusing the resulting sintered glass perform to the glass plug. The sintered glass perform was then drawn into core cane, overclad with silica, and drawn into a fiber using standard techniques. The fiber was then deuterized at 50° C. for 30 hours. The resulting single mode fiber, which had an average core $P_2O_5$ concentration of about 0.03 wt % and an average core $K_2O$ concentration of about 50 ppm, had an attenuation of about 0.181 dB/km and a hydrogen induced attenuation change of about 0.002 dB/km at a wavelength of about 1550 nm after being subjected to a 0.01 atm hydrogen partial pressure for 144 hours.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical fiber comprising:
   a silica-based core comprising germania, an alkali metal oxide and $P_2O_5$; and
   a silica-based cladding surrounding and directly adjacent to the core wherein the attenuation of the optical fiber at 1550 nm is less than 0.185 dB/km.

2. The optical fiber of claim 1, wherein the alkali metal oxide is $K_2O$.

3. The optical fiber of claim 2, wherein $K_2O$ is present in the core in an average concentration of from 10 to 200 ppm.

4. The optical fiber of claim 3, wherein $K_2O$ is present in the core in an average concentration of from 10 to 60 ppm.

5. The optical fiber of claim 1, wherein $P_2O_5$ is present in the core in an average concentration of from 0.01% to 0.05% by weight.

6. The optical fiber of claim 4, wherein $P_2O_5$ is present in the core in an average concentration of from 0.01% to 0.05% by weight.

7. The optical fiber of claim 1, wherein the attenuation of the optical fiber at 1550 nm is less than 0.180 dB/km.

8. The optical fiber of claim 6, wherein the optical fiber exhibits a maximum hydrogen induced attenuation change of less than about 0.003 dB/km at a wavelength of about 1550 nm after being subjected to a 0.01 atm hydrogen partial pressure for at least 144 hours.

9. The optical fiber of claim 1, wherein the optical fiber exhibits a total dispersion of from 15 to 25 ps/nm/km at 1550 nm and a dispersion slope of less than about 0.07 $ps/nm^2/km$ at 1550 nm.

10. An optical fiber comprising:
    a silica-based core comprising germania, an alkali metal oxide and $P_2O_5$; and
    a silica-based cladding surrounding and directly adjacent to the core, wherein the optical fiber exhibits a maximum hydrogen induced attenuation change of less than about 0.003 dB/km at a wavelength of about 1550 nm after being subjected to a 0.01 atm hydrogen partial pressure for at least 144 hours.

11. The optical fiber of claim 10, wherein the alkali metal oxide is $K_2O$.

12. The optical fiber of claim 11, wherein $K_2O$ is present in the core in an average concentration of from 10 to 200 ppm.

13. The optical fiber of claim 12, wherein $K_2O$ is present in the core in an average concentration of from 10 to 60 ppm.

14. The optical fiber of claim 10, wherein $P_2O_5$ is present in the core in an average concentration of from 0.01% to 0.05% by weight.

15. The optical fiber of claim 13, wherein $P_2O_5$ is present in the core in an average concentration of from 0.01% to 0.05% by weight.

16. An optical fiber comprising:
    a silica-based core comprising germania and $P_2O_5$; and
    a silica-based cladding surrounding and directly adjacent to the core; wherein the attenuation of the optical fiber at 1550 nm is less than 0.185 dB/km; and
    the optical fiber exhibits a maximum hydrogen induced attenuation change of less than about 0.003 dB/km at a wavelength of about 1550 nm after being subjected to a 0.01 atm hydrogen partial pressure for at least 144 hours.

17. The optical fiber of claim 16, wherein $P_2O_5$ is present in the core in an average concentration of from 0.01% to 0.05% by weight.

18. The optical fiber of claim 16, wherein the attenuation of the optical fiber at 1550 nm is less than 0.180 dB/km.

19. The optical fiber of claim 16, wherein the optical fiber exhibits a total dispersion of from 15 to 25 ps/nm/km at 1550 nm and a dispersion slope of less than about 0.07 $ps/nm^2/km$ at 1550 nm.

* * * * *

UNITED STATES PATENT AND TRADEMARK OFFICE
CERTIFICATE OF CORRECTION

| | | |
|---|---|---|
| PATENT NO. | : 7,489,850 B1 | |
| APPLICATION NO. | : 11/978858 | |
| DATED | : February 10, 2009 | |
| INVENTOR(S) | : George Edward Berkey et al. | |

It is certified that error appears in the above-identified patent and that said Letters Patent is hereby corrected as shown below:

*Col.*    *Line*                  *Description*

6      1              Please delete "AMAX" and insert -- $\Delta_{MAX}$ --

Signed and Sealed this

Sixteenth Day of October, 2012

David J. Kappos
*Director of the United States Patent and Trademark Office*